UNITED STATES PATENT OFFICE.

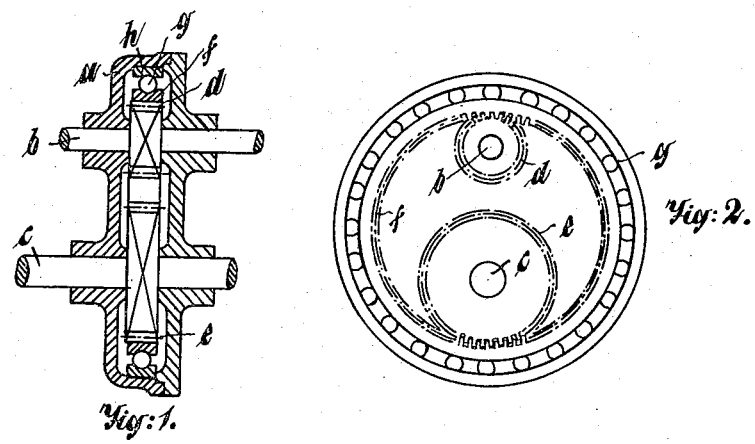
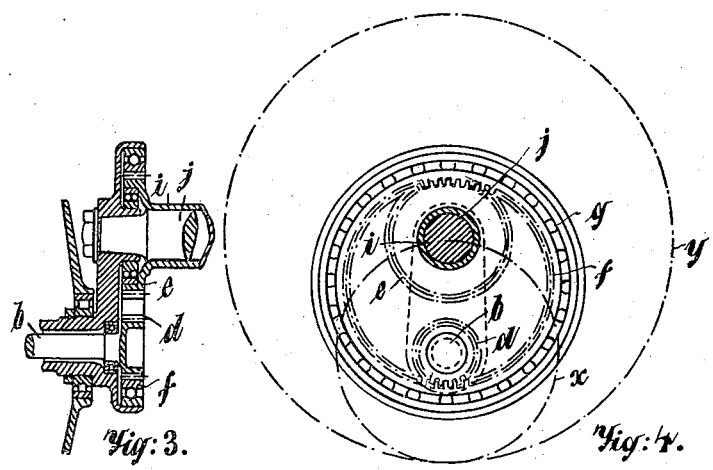
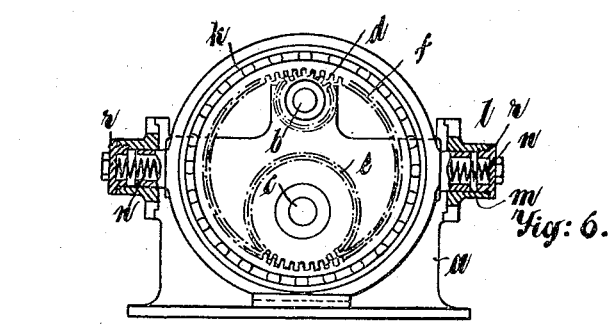

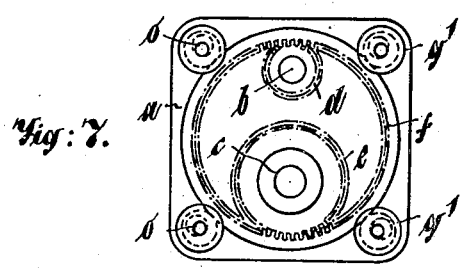
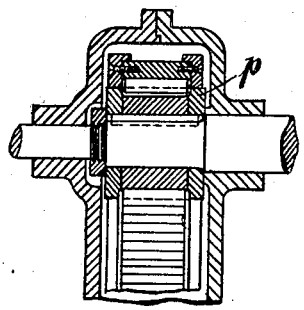
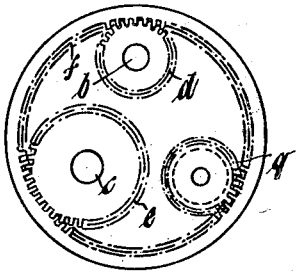
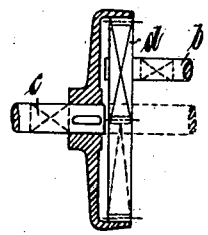
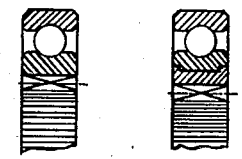

JOSEPH ZEITLIN, OF FULHAM, LONDON, ENGLAND.

TOOTHED GEARING.

1,347,730.  Specification of Letters Patent.  Patented July 27, 1920.

Application filed May 28, 1918. Serial No. 237,123.

*To all whom it may concern:*

Be it known that I, JOSEPH ZEITLIN, a subject of the King of Great Britain and Ireland, residing at 115 Bishop's Mansions, Bishops Park Road, Fulham, London, S. W., England, have invented new and useful Improvements in Toothed Gearing, of which the following is a specification.

This invention relates to toothed gearing mechanism and in particular to a type in which two or more wheels in defined positions have to be rotated in the same direction through another wheel or idler and within a predetermined ratio. The object of the invention is the construction and arrangement of parts of such gearing whereby problems in this type of gear can be solved in a practically effective and efficient manner, in a more compact form than hitherto, the engagement of a larger number of teeth of the wheel elements is secured, and greater facilities of relative adjustment of said elements one to the other are obtained than can be effected in known arrangements. Taking a three element gear combination as an example according to my invention, the driving and driven wheels of any desired ratio and to be rotated in the same direction are mounted on their respective shafts or spindles and surrounded or encompassed by an internally toothed gear element in the form of a ring which is adapted to mesh with them. This third element is rotatably mounted in or on an annular guide or housing or guide rollers which surrounds or surround it and the said two wheels and their shafts.

This housing may be supported in a fixed position or be made adjustable relative to the axes of the two shafts to allow of the meshing of the teeth of the two wheels and the internally toothed ring to be regulated in amount. The housing may be supported elastically if necessary in order to take up any shock or inequality in the driving effort.

This construction enables the third element to be very substantially supported in its bearing by antifriction means in such a way as to insure great durability.

In order that the invention may be the better understood I will now proceed to describe the same in relation to the accompanying drawings, reference being had to the letters and figures marked thereon.

Like letters refer to like parts in the various figures in which:—

Figure 1 is a longitudinal sectional view of a mechanism comprising two shafts and pinions mechanically connected by an annular element mounted in a housing in accordance with this invention.

Fig. 2 is a diagrammatic side view of same.

Figs. 3 and 4 show the invention applied to the crank shaft of a reciprocating piston engine with differential stroke as described in the specifications of the United States Letters Patent Nos. 1177913 issued 4th April 1916 and 1160966 issued 16th November 1915.

Fig. 5 is a diagrammatic representation illustrating the limitations and difficulties of the ordinary arrangement of the annular toothed element and pinion revolving in the same direction.

Fig. 6 shows the invention arranged with the annular element mounted elastically to take up any inequality in the driving effort or adjustably to regulate the meshing of its teeth with the pinions.

Fig. 7 is a diagrammatic view of the invention arranged so that the annular element is mounted to rotate on rollers mounted on a fixed axis.

Figs. 8 and 9 show a modified arrangement of Fig. 6 in which the annular element is mounted to revolve on shroudings on the two pinions and on a third wheel or roller.

Fig. 10 is a sectional view of the ball races of the annular element in which one ball race is integral with the element.

Fig. 11 is a modified arrangement in which the ball race on the annular element is formed separate therefrom.

Referring to Figs. 1 and 2 within a housing *a* are rotatably mounted shafts *b* and *c* carrying toothed pinions *d* and *e* respectively. Geared with the pinions *d* and *e* is an internally toothed ring *f* rotatably mounted on balls *g* or rollers on a race *h* fixed in the housing *a*. When the shaft *b* with pinion *d* is revolved it drives the shaft *c* with pinion *e* through the toothed revolving ring *f* in the same direction.

Referring to Figs. 3, 4 and 5 the sleeve *i* on the crank pin *j* is to be given a rotation thereon of 1 revolution to 2 revolutions of the casing carrying the cylinders for which purpose the small pinion $d$ which is driven by the casing is geared to the large pinion $e$ by the toothed ring $f$, the sleeve $i$ being attached to or forming a part of the pinion $e$, hence the sleeve $i$ rotates once about the crank pin $j$ for every two revolutions of the engine casing about the stationary crankshaft and in the same direction. In Fig. 4 the two dotted circles $x$ $y$ indicate the pitch lines of the elements of an ordinary arrangement to give the same result theoretically but Fig. 5 shows clearly that the pinion $d$ on the shaft $b$ would overlap the other shaft $c$ beyond the axis thereof and consequently the shaft $c$ could not be carried through as indicated in dotted lines in Fig. 5. In this case a ratio of more than 2 to 1 must be used if the shaft $c$ is to be carried through and even then the shaft $b$ would be overhung in its bearing. In this invention both shafts can be supported on each side and all overhang avoided. The dotted pitch lines $x$ and $y$ in Fig. 4 show by comparison the compactness of the mechanism according to this invention with that of known arrangements where such arrangement is possible. Another important advantage obtained by this invention is that when the distance between the axes of the two pinions is definitely fixed the peripheral speed for a given number of revolutions per minute is much lower by the arrangement according to this invention than with the ordinary arrangement as indicated by the dotted lines.

In Fig. 6 the ring $f$ is rotatably mounted in a frame $k$ provided with stems $l$ adapted to slide in pockets $m$ in the housing $a$ and to be acted upon by springs $n$ disposed in the pockets so that the frame $k$ is floatingly supported in the housing whereby any inequality of driving effort from the pinion $d$ to the pinion $e$ is compensated for by the springs $n$. The normal position of the frame $k$ relative to the axes of the shafts $b$ and $c$ can be regulated if desired so as to adjust the amount of mesh of the pinions $d$ and $e$ with the teeth of the ring $f$ by means of caps $r$ screwed into the pockets $m$.

In place of the balls and ball races in Fig. 7 the ring $f$ is supported on rollers $q'$ mounted on studs $o$ fixed in the housing $a$. The studs $o$ may be provided with an eccentric portion indicated in dotted lines to afford means of adjustment or to take up any wear.

In Figs. 8 and 9 the pinions $d$ and $e$ and the toothed ring $f$ are provided with shroudings $p$ corresponding in diameter with the pitch lines of their teeth. A third pinion $q$ or equivalently a roller is provided to form the other element on which the ring $f$ runs. This arrangement is the internal supporting of the ring $f$ in contradistinction to the external supporting of it as illustrated in Fig. 7. One or more of the shroudings $p$ are made detachable from the pinions or the ring, or both, to enable the parts to be assembled without difficulty.

I claim:—

1. A toothed gearing consisting of a plurality of pinions, an internally toothed ring embracing and engaging said pinions, a housing for rotatably supporting said ring to enable it to revolve when motion is being transmitted through same to or from one pinion to another, antifriction devices adapted to support said ring in said housing so that the ring can revolve and transmit motion from one pinion to another pinion, the said pinions being rotatably mounted adjacent to and independent of said housing, and means whereby the said housing is relatively movable to said pinions so that the ring and the pinions can be adjusted relatively to one another, substantially as described.

2. A toothed gearing consisting of a plurality of pinions, an internally toothed ring embracing and engaging said pinions, a housing for rotatably supporting said ring to enable it to revolve when motion is being transmitted through the same to or from one pinion to another, antifriction devices adapted to support said ring in said housing so that the said ring can revolve and transmit motion from one pinion to another pinion, a frame in which the said pinions are rotatably mounted, and in which the said housing is movable relative to said pinions so that the ring and the pinions can be adjusted relatively to one another, and an elastic resistance in association with said frame adapted to permit any inequality of driving effort through the gearing to be compensated for, substantially as described.

3. A toothed gearing consisting of a plurality of pinions, an internally toothed ring embracing and engaging said pinions, a housing for rotatably supporting said ring to enable it to revolve when motion is being transmitted through same to or from one pinion to another, antifriction devices adapted to support said ring in said housing so that said ring can revolve and transmit motion from one pinion to another pinion, the said pinions being rotatably mounted in said housing, and shroudings on the ring and on a plurality of pinions adapted to internally support said ring and allow of its rotation about its axis, substantially as described.

In testimony whereof I have signed my name to this specification in the presence of two subscribing witnesses.

JOSEPH ZEITLIN.

Witnesses:
DORIS HITCHCOCK,
WALTER CARVER.